United States Patent
Yamazaki et al.

(12)

(10) Patent No.: US 12,085,137 B2
(45) Date of Patent: Sep. 10, 2024

(54) SUSPENSION DEVICE

(71) Applicant: HONDA MOTOR CO., LTD., Tokyo (JP)

(72) Inventors: Ryosuke Yamazaki, Wako (JP); Takashi Yanagi, Wako (JP); Kazuya Konada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 174 days.

(21) Appl. No.: 17/681,717

(22) Filed: Feb. 26, 2022

(65) Prior Publication Data

US 2022/0282767 A1  Sep. 8, 2022

(30) Foreign Application Priority Data

Mar. 2, 2021  (JP) ................. 2021-032238

(51) Int. Cl.
  *F16F 15/03* (2006.01)
  *B60G 17/015* (2006.01)
  (Continued)

(52) U.S. Cl.
  CPC ............... *F16F 15/03* (2013.01); *F16F 6/00* (2013.01); *F16F 15/023* (2013.01);
  (Continued)

(58) Field of Classification Search
  CPC .. F16F 15/03; F16F 6/00; F16F 15/023; F16F 2222/06; F16F 2222/12; F16F 9/185;
  (Continued)

(56) References Cited

U.S. PATENT DOCUMENTS 4,749,070 A * 6/1988 Moser ............... F16F 9/46
                                                    251/129.08
5,293,969 A * 3/1994 Yamaoka ............. F16F 15/03
                                                    188/266.5
(Continued)

FOREIGN PATENT DOCUMENTS

CN  103429929 A  12/2013
CN  107771255 A   3/2018
(Continued)

OTHER PUBLICATIONS

Office Action received in corresponding CN application No. 202210172300.2 dated May 25, 2023, English translation included, (7 pages).

(Continued)

*Primary Examiner* — Bradley T King
*Assistant Examiner* — James K Hsiao
(74) *Attorney, Agent, or Firm* — Rankin, Hill & Clark LLP

(57) ABSTRACT

A suspension device includes: a hydraulic damper including a rod provided with a valve for generating a hydraulic pressure when the rod is displaced between a first liquid chamber and a second liquid chamber; an electric damper configured to electrically displace the rod by an actuator; and a communication passage that establishes communication between the first liquid chamber and the second liquid chamber while bypassing the valve during operation of the electric damper.

7 Claims, 6 Drawing Sheets

(51) Int. Cl.
*F16F 6/00* (2006.01)
*F16F 15/02* (2006.01)
*F16F 15/023* (2006.01)

(52) U.S. Cl.
CPC .... *B60G 17/0157* (2013.01); *B60G 2202/422* (2013.01); *B60G 2500/10* (2013.01); *B60G 2800/162* (2013.01); *F16F 2222/06* (2013.01); *F16F 2222/12* (2013.01)

(58) Field of Classification Search
CPC ...... F16F 2230/24; F16F 13/00; B60G 13/02; B60G 17/0157; B60G 2202/422; B60G 2500/10; B60G 2800/162; B60G 2206/41; B60G 2202/20
See application file for complete search history.

(56) References Cited

U.S. PATENT DOCUMENTS

| | | | | |
|---|---|---|---|---|
| 5,316,113 | A | 5/1994 | Yamaoka | |
| 6,471,018 | B1* | 10/2002 | Gordaninejad | F16F 9/535 188/322.22 |
| 7,722,056 | B2* | 5/2010 | Inoue | B60G 15/063 280/6.154 |
| 7,938,410 | B2* | 5/2011 | Buma | B60G 17/0165 280/5.509 |
| 7,997,392 | B2* | 8/2011 | Stork | F16F 9/535 188/267.1 |
| 8,041,479 | B2* | 10/2011 | Buma | B60G 21/0555 180/902 |
| 8,109,371 | B2* | 2/2012 | Kondo | B60G 17/0272 188/266.5 |
| 8,127,900 | B2* | 3/2012 | Inoue | F16F 15/03 188/267 |
| 8,544,620 | B2* | 10/2013 | Inoue | B60G 15/065 188/297 |
| 8,641,052 | B2* | 2/2014 | Kondo | B60G 13/14 188/266.2 |
| 8,843,274 | B2* | 9/2014 | Ogawa | B60G 17/08 701/37 |
| 9,835,222 | B2* | 12/2017 | Berg | F16H 25/24 |
| 10,690,215 | B2* | 6/2020 | Sakka | B60G 13/14 |
| 11,745,597 | B2* | 9/2023 | Agra | B60G 17/015 267/140.14 |
| 2009/0079145 | A1* | 3/2009 | Inoue | B60G 17/08 267/140.14 |
| 2012/0013277 | A1* | 1/2012 | Ogawa | H02P 3/12 318/368 |
| 2013/0341140 | A1 | 12/2013 | Nakajima | |
| 2014/0238793 | A1* | 8/2014 | Nanbara | F16F 15/03 188/267 |
| 2015/0300443 | A1* | 10/2015 | Saito | F16F 9/3214 188/267.2 |
| 2015/0345134 | A1* | 12/2015 | Takahashi | F16F 15/027 52/167.2 |
| 2017/0268594 | A1* | 9/2017 | Mori | F16F 9/18 |
| 2018/0119770 | A1 | 5/2018 | Bruno et al. | |
| 2018/0231094 | A1* | 8/2018 | Saito | F16F 9/3214 |
| 2019/0178329 | A1* | 6/2019 | Dumitru | F16F 9/16 |
| 2019/0264771 | A1* | 8/2019 | Sakka | F16F 9/18 |

FOREIGN PATENT DOCUMENTS

| | | |
|---|---|---|
| JP | 2002-227927 A | 8/2002 |
| JP | 2004-124992 A | 4/2004 |
| JP | 2009-166647 A | 7/2009 |
| JP | 2020-139545 A | 9/2020 |

OTHER PUBLICATIONS

Japanese Office Action received in corresponding Japanese application No. 2021-032238 dated May 28, 2024 with English translation (9 pages).

\* cited by examiner

SUSPENSION DEVICE

CROSS-REFERENCE TO RELATED APPLICATION

This application claims the benefit of foreign priority to Japanese Patent Application No. 2021-032238, filed on Mar. 2, 2021, which is incorporated by reference in its entirety.

TECHNICAL FIELD

The present invention relates to a suspension device.

BACKGROUND

JP 2002-227927 A discloses that a hydraulic damper is housed inside an electromagnetic damper. The piston of the hydraulic damper is provided with a fluid passage and a pin inserted therein. The damping force of the hydraulic damper decreases in a normal stroke because a pin reduced diameter portion of the pin faces the fluid passage and a relatively large gap is formed. Meanwhile, the damping force of the hydraulic damper increases in an end-side stroke region because a large diameter portion of the pin faces the fluid passage.

As described above, according to the technique of JP 2002-227927 A, the electromagnetic damper and the hydraulic damper are adjusted using the reduced diameter portion and the large diameter portion of the pin. However, this configuration has a drawback that the outer diameter of the piston increases and the structure is complicated.

In view of the above, it is an object of the present invention to provide a suspension device capable of switching between an electric damper and a hydraulic damper even if the outer diameter of the piston is relatively small and the structure of the suspension device is relatively simple.

SUMMARY

According to one aspect of the present invention, there is provided a suspension device comprising: a hydraulic damper including a rod provided with a valve for generating a hydraulic pressure when the rod is displaced between a first liquid chamber and a second liquid chamber; an electric damper configured to electrically displace the rod by an actuator; and a communication passage that establishes communication between the first liquid chamber and the second liquid chamber while bypassing the valve during operation of the electric damper.

BRIEF DESCRIPTION OF THE DRAWINGS

The drawings described herein are for illustration purposes only and are not intended to limit the scope of the present invention in any way.

DETAILED DESCRIPTION

One embodiment of the present invention is described below with reference to the drawings.

Figure 1A:
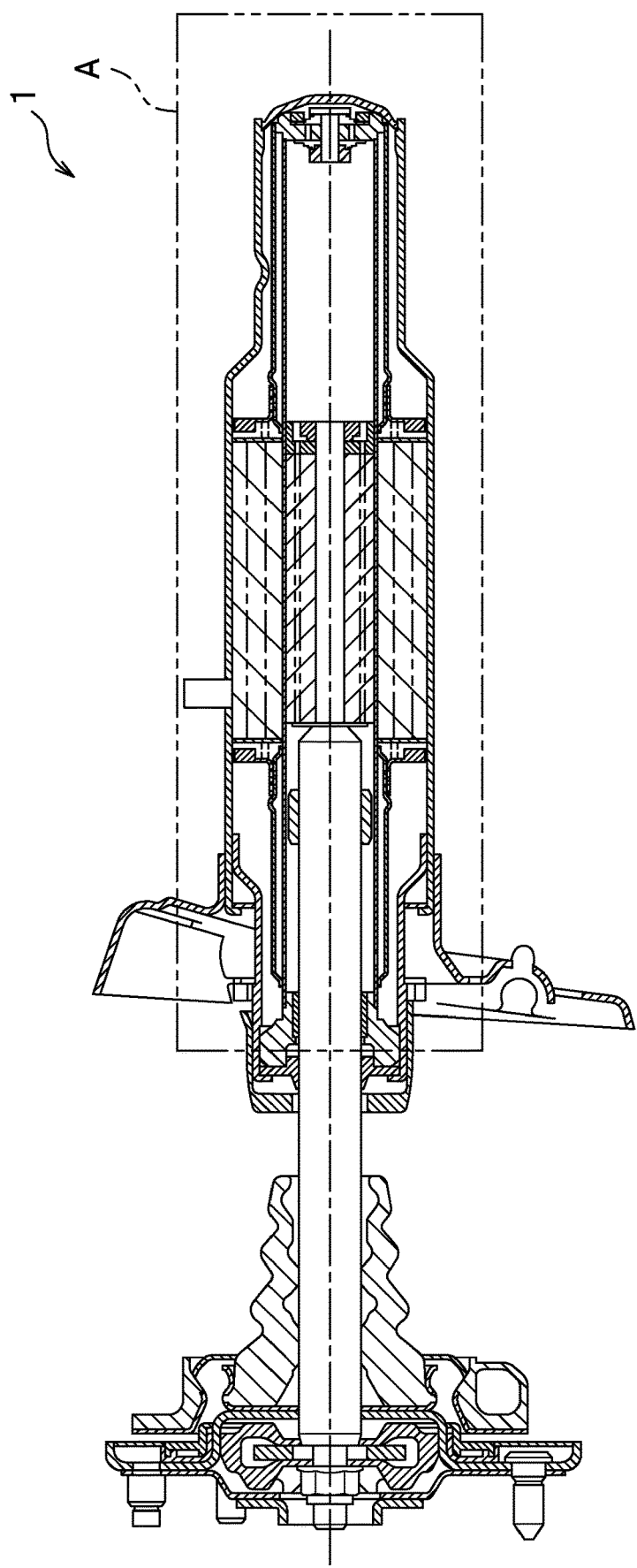
FIG. 1A is a cross-sectional view of a suspension device according to one embodiment of the present invention.
Figure 1B:
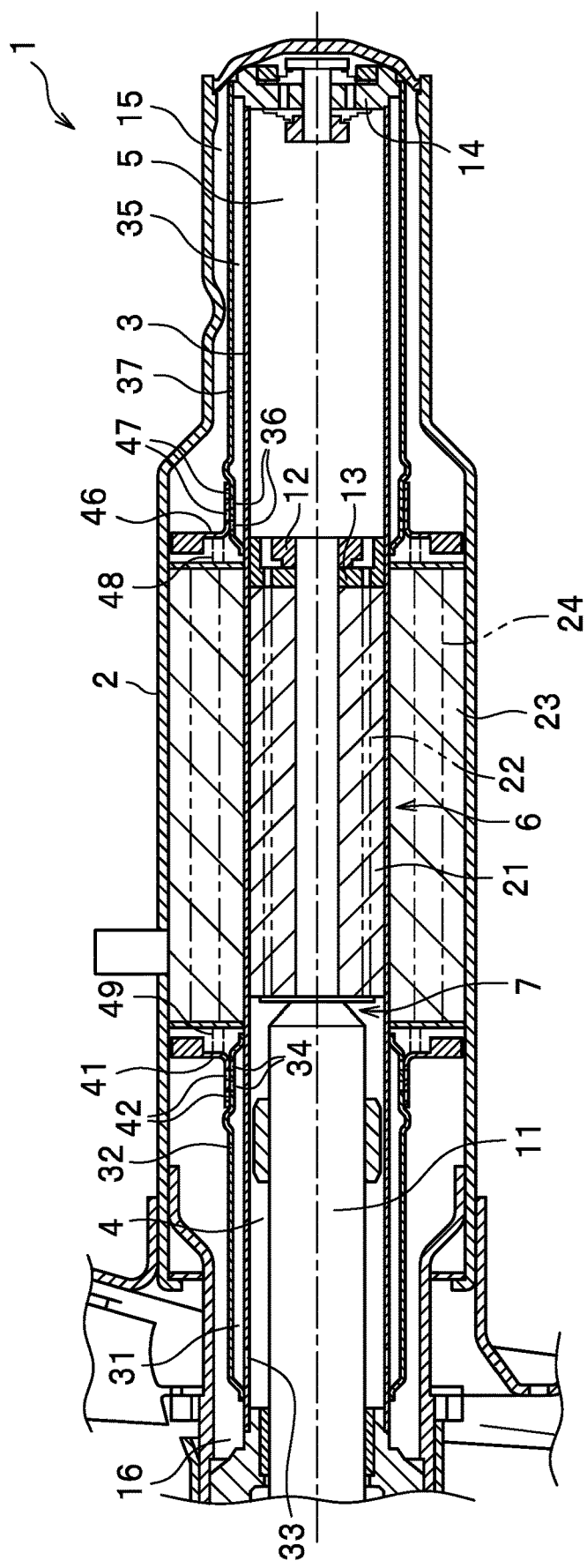
FIG. 1B is an enlarged view of the part A in FIG. 1A.

FIG. 1A is a cross-sectional view of a suspension device according to one embodiment of the present invention. FIG. 1B is an enlarged view of the part A in FIG. 1A. An inner cylinder 3 is housed in an outer casing 2 of a suspension device 1. Hereinafter, the right (front) side of the suspension device 1 shown in FIG. 1B may be referred to as a front side. The left side of the suspension device 1 shown in FIG. 1B may be referred to as a rear side.

The suspension device 1 includes a hydraulic damper 7. The hydraulic damper 7 includes a rod 11, a piston 12, valves 13 and 14, and the like. The hydraulic damper 7 functions as a conventional suspension. The rod 11 coaxial with the inner cylinder 3 is housed inside the inner cylinder 3. The rod 11 is movable inside the inner cylinder 3 in the longitudinal direction of the inner cylinder 3 (right-left direction in FIG. 1B). The piston 12 is provided on the longitudinally front side (right side) of the rod 11. The outer peripheral surface of the piston 12 moves along the inner peripheral surface of the inner cylinder 3.

The piston 12 partitions the inside of the inner cylinder 3 into a first liquid chamber 4 disposed on the rear side of the piston 12 and a second liquid chamber 5 disposed on the front side of the piston 12. The piston 12 is provided with a cylindrical magnet 21, and the magnet 21 is provided with an in-magnet flow passage 22 that establishes communication between the first liquid chamber 4 and the second liquid chamber 5. A valve 13 is provided at a head portion of the piston 12 in the in-magnet flow passage 22. A valve 14 is provided at a head portion of the inner cylinder 3. The valve 14 can establish communication between the inside of the inner cylinder 3, and a space 15 between the inner cylinder 3 and the outer casing 2. The space formed in the suspension device 1 is filled with liquid such as oil. When the rod 11 is displaced between the first liquid chamber 4 and the second liquid chamber 5 with the valves 13 and 14 open, the liquid flows through the in-magnet flow passage 22 and the valves 13 and 14. This causes the piston 12 to move, so that the hydraulic damper 7 can generate a hydraulic pressure.

The suspension device 1 also includes an electric damper 6 (electromagnetic damper). The electric damper 6 includes the magnet 21, a coil 23, and the like. The electric damper 6 functions as an electromagnetic suspension. The cylindrical coil 23 (actuator) is provided between the outer casing 2 and the inner cylinder 3. When the coil 23 is energized, a magnetic field is generated, and the magnetic field acts on the magnet 21, so that the piston 12 and also the rod 11 can move in the axial directions thereof. A space 16 is formed between the outer casing 2 and the inner cylinder 3. An in-coil passage 24 is provided in the coil 23. The in-coil passage 24 establishes communication between the space 15 and the space 16.

A bypass passage chamber 31 is provided inside the space 16 and outside the inner cylinder 3. A bypass holes 33 is formed in a rear side of a wall of the inner cylinder 3 that constitutes the bypass passage chamber 31. The bypass hole 33 establishes communication between the first liquid chamber 4 and the bypass passage chamber 31. Further, bypass holes 34 are formed in a front side of a wall 32 of the bypass passage chamber 31 that is closer to the space 16. The bypass holes 34 establish communication between the space 16 and the bypass passage chamber 31. The first liquid chamber 4 and the space 16 can communicate with each other through the bypass passage chamber 31 and the bypass holes 33 and 34.

Similarly, a bypass passage chamber 35 is provided inside the space 15 and outside the inner cylinder 3. Bypass holes 36 are formed in a rear side of a wall 37 of the bypass passage chamber 35 that is closer to the space 15. The bypass holes 36 establish communication between the space 15 and the bypass passage chamber 35. The front side of the bypass passage chamber 35 is released, and the second liquid chamber 5 and the space 15 can communicate with each other through the bypass passage chamber 35 and the bypass holes 36.

With this configuration, the bypass passage chamber 31, the space 16, the in-coil passage 24, the space 15, the bypass passage chamber 35, and the like constitute a communication passage that establishes communication between the first liquid chamber 4 and the second liquid chamber 5 while bypassing the valve 13.

Figure 2:
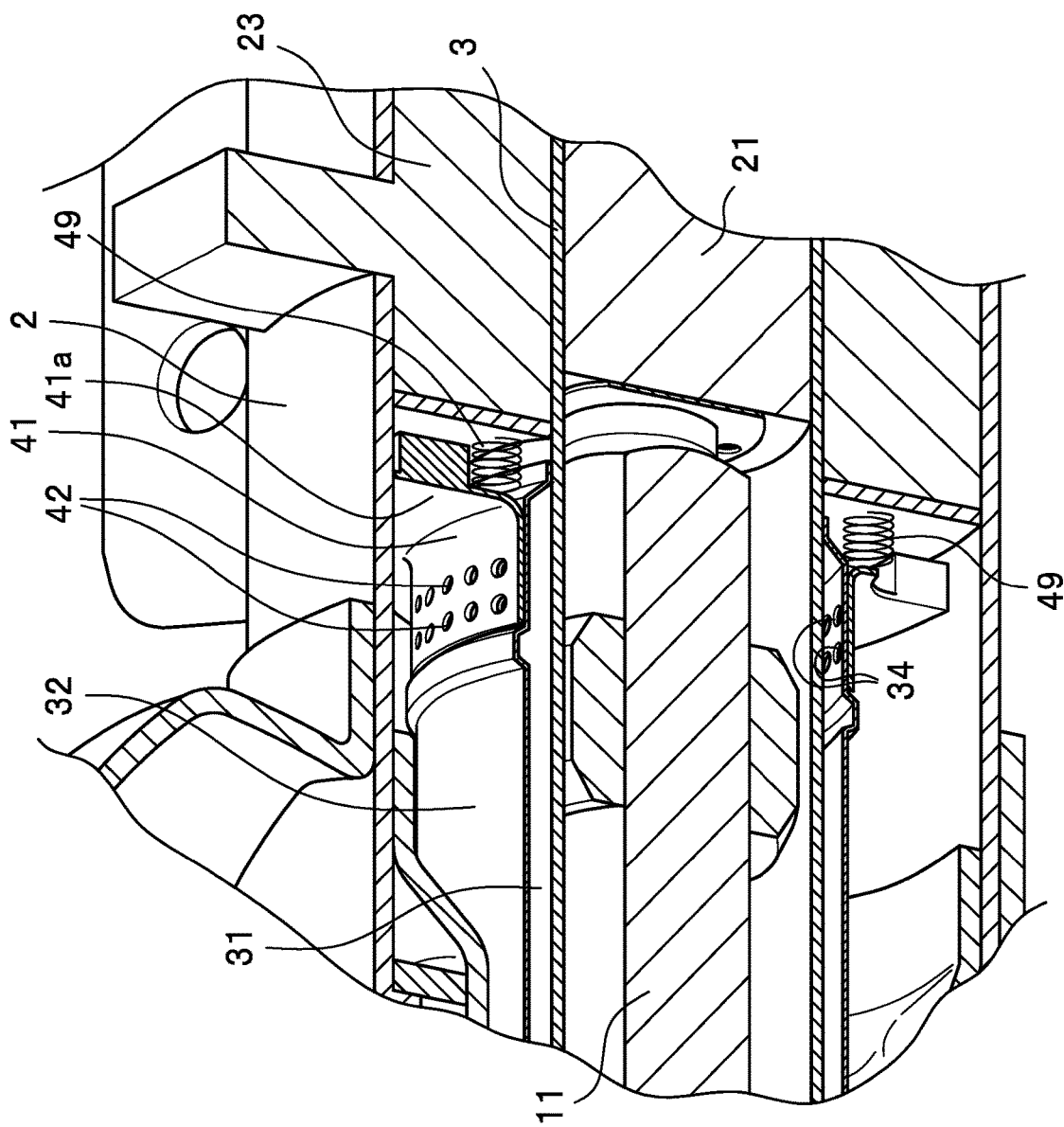
FIG. 2 is an enlarged perspective view partially showing a shutter member of the suspension device according to one embodiment of the present invention.

An annular shutter member 41 is slidably wound around the inner cylinder 3 at a position corresponding to the bypass holes 34. FIG. 2 is an enlarged perspective view partially showing the shutter member 41. A plurality of punched holes 42 are formed in an annular portion of the shutter member 41. Further, a flange-shaped member 41a protrudes outward from the annular shutter member 41. Referring back to FIG. 1B, a spring 49 biases the shutter member 41 to the rear side in the axial direction of the inner cylinder 3. In this state, the shutter member 41 closes the bypass holes 34. The shutter member 41 is made of metal. The shutter member 41 is caused to move against the biasing force of the spring 49 by the magnetic field generated when the coil 23 is energized. As a result, the positions of the bypass holes 34 and the punched holes 42 coincide with each other, and the bypass holes 34 are opened.

As seen in FIG. 1B, an annular shutter member 46 is slidably wound around the inner cylinder 3 at a position corresponding to the bypass holes 36. The configuration of the shutter member 46 is similar to that of the shutter member 41. A plurality of punched holes 47 are formed in an annular portion of the shutter member 46. A spring 48 biases the shutter member 46 to the front side in the axial direction of the inner cylinder 3. The shutter member 46 is biased to the front side by a spring 48 in the axial direction of the inner cylinder 3. In this state, the shutter member 46 closes the bypass holes 36. The shutter member 46 is made of metal. The shutter member 46 is caused to move against the biasing force of the spring 48 by the magnetic field generated when the coil 23 is energized. As a result, the positions of the bypass holes 36 and the punched holes 47 coincide with each other, and the bypass holes 36 are opened.

When the bypass holes 34 and 36 are opened, the bypass passage chamber 31, the space 16, the in-coil passage 24, the space 15, and the bypass passage chamber 35 constitute a communication passage that establishes communication between the first liquid chamber 4 and the second liquid chamber 5 while bypassing the valve 13. In this instance, the shutter members 41 and 46 serve as an opening and closing unit that opens and closes the communication passage.

As is apparent from the above description, the electric damper 6 is an electromagnetic damper that uses magnetic force generated by a linear motor including the magnet 21, the coil 23, and the like.

The shutter members 41 and 46 serving as the opening and closing unit use, when they are opened, magnetic force generated by the linear motor.

Figure 3A:
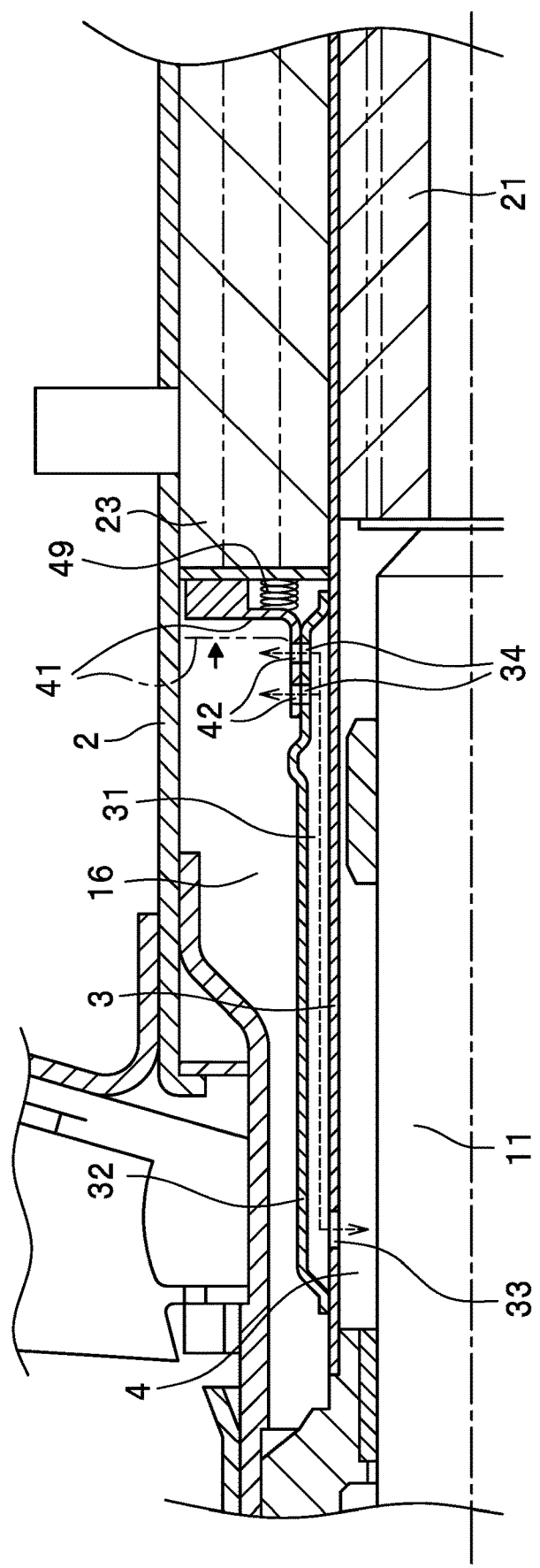
FIG. 3A is a partially enlarged view of FIG. 1B.
Figure 3B:
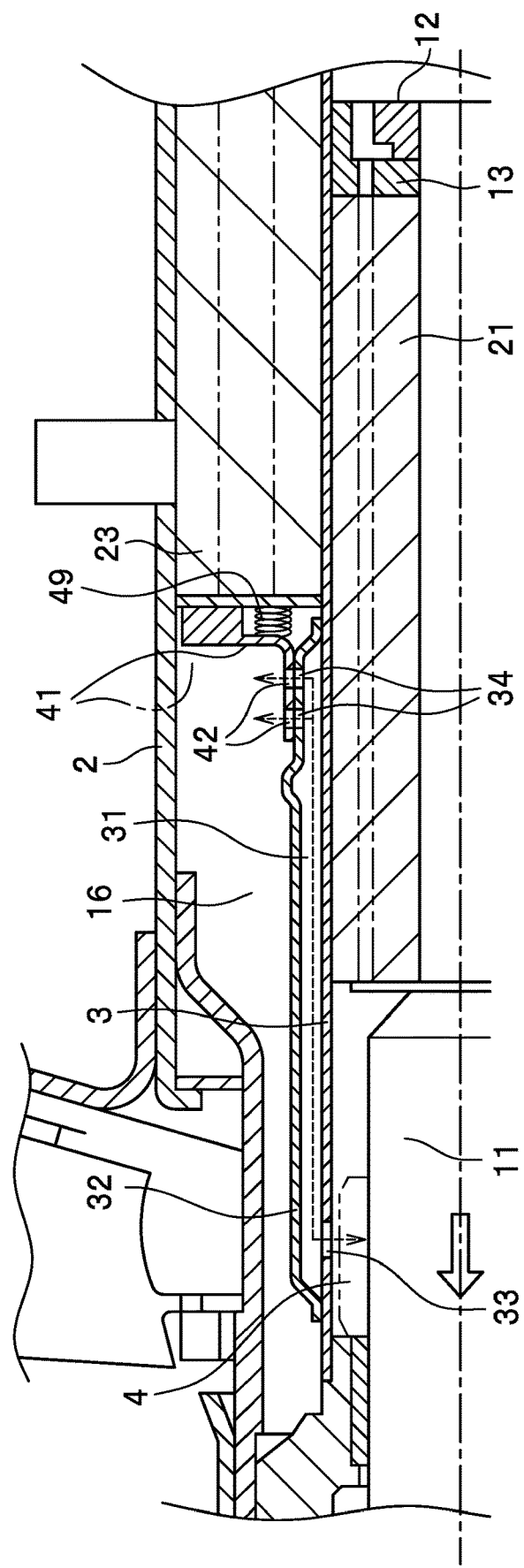
FIG. 3B is a diagram illustrating a state where the electric damper in FIG. 3A has the maximum stroke.

FIG. 3A is a partially enlarged view of FIG. 1B. FIG. 3B is a diagram illustrating a state where the electric damper in FIG. 3A has the maximum stroke. As illustrated in FIG. 3B, the bypass hole 33 is provided between the first liquid chamber 4 and the bypass passage chamber 31 at a position where the magnet 21 does not close the bypass hole 33 when the electric damper 6 has the maximum stroke.

Next, the operation of the present embodiment will be described.

Figure 4A:
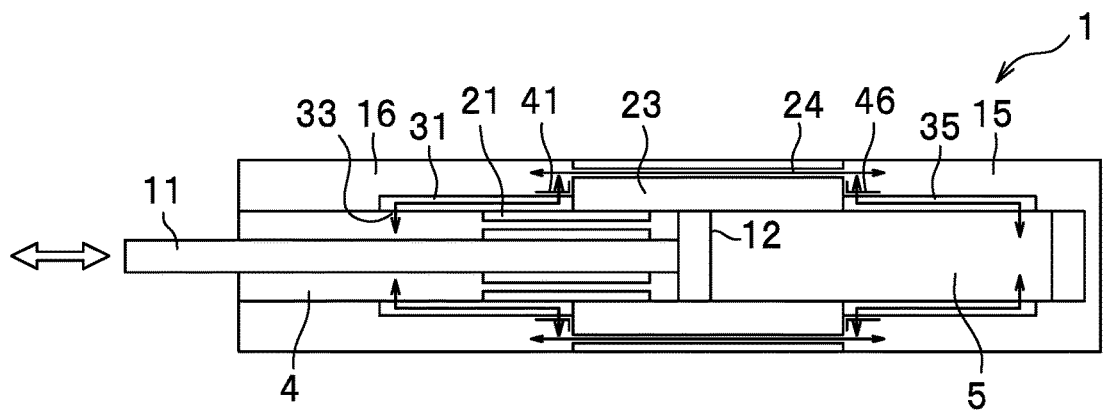
FIG. 4A is a conceptual diagram of the suspension device for explaining the operation of the suspension device according to one embodiment of the present invention.
Figure 4B:
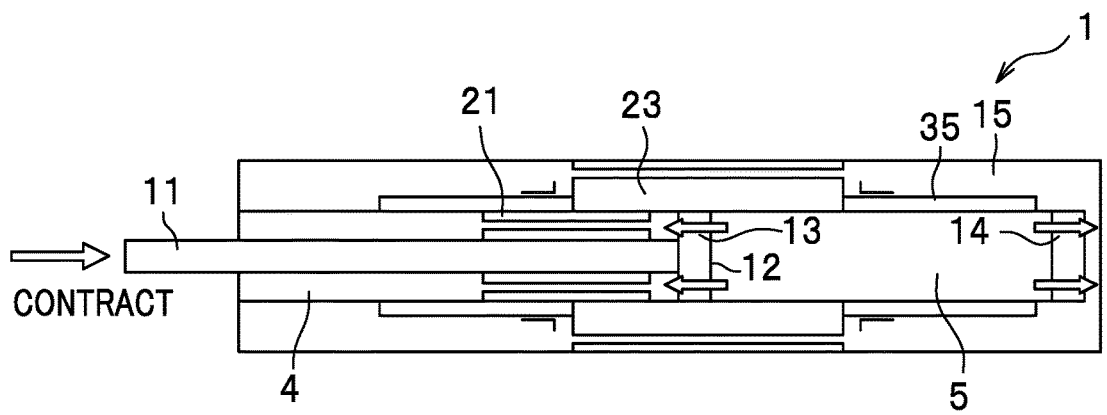
FIG. 4B is a conceptual diagram of the suspension device for explaining the operation of the suspension device according to one embodiment of the present invention.
Figure 4C:
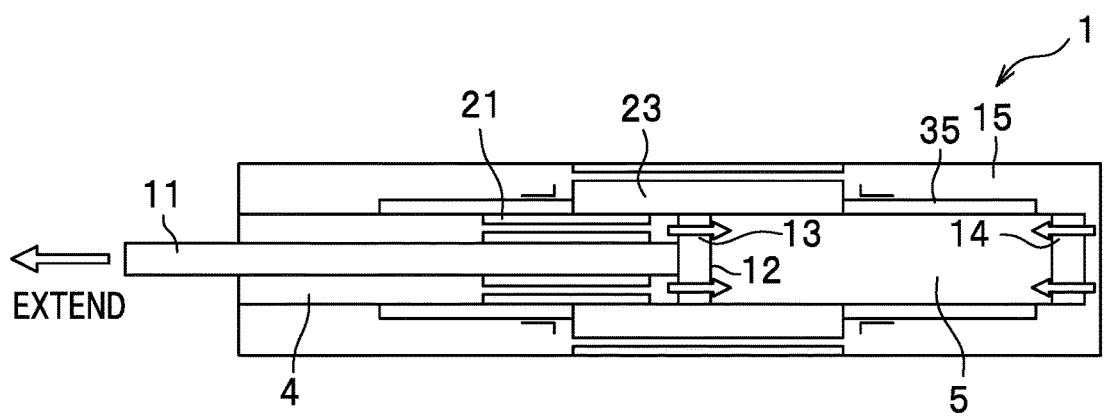
FIG. 4C is a conceptual diagram of the suspension device for explaining the operation of the suspension device according to one embodiment of the present invention.

FIGS. 4A to 4C are conceptual diagrams of the suspension device 1 for explaining the operation of the suspension device 1. During the normal traveling of the vehicle, the suspension device 1 uses the electric damper 6 as shown in FIG. 4A. In this case, the shutter members 41 and 46 are opened. Accordingly, the chambers are connected with each other through the communication passage, so that the liquid is movable in the suspension device 1 as indicated by arrows in FIG. 4A but does not pass through the valves 13 and 14. Therefore, no hydraulic pressure is generated, and damping by the liquid does not occur. The electric damper 6 controls the piston 12 by electromagnetic force to generate damping force against vibration of the vehicle.

FIGS. 4B and 4C are conceptual diagrams in the case where the hydraulic damper is used in the suspension device 1. FIG. 4B illustrates a state where the rod 11 contracts (enters the suspension device 1), and FIG. 4C illustrates a state where the rod extends (exits from the suspension device 1). As described above, the electric damper 6 is used during the normal traveling of the vehicle. However, when the electric damper 6 is controlled to OFF or the electric damper 6 is failed, the hydraulic damper 7 is used. In other words, when the electric damper 6 is controlled to OFF or the electric damper 6 is failed, the energization to the coil 23 is stopped, so that the shutter members 41 and 46 are closed. As a result, the liquid flow as indicated by arrows in FIG. 4A is lost. Therefore, as with a normal double-cylinder damper, the hydraulic damper 7 generates damping force against vibration of the vehicle by the valves 13 and 14.

As described above, when a system failure occurs in the electric damper 6 (e.g., an electric current cannot be supplied to the coil 23), the suspension device 1 can quickly switch from the electric damper 6 to the hydraulic damper 7. It is therefore possible to stabilize the behavior of the vehicle without shortage of damping just after the failure of the system.

Further, since it is only required to form the communication passage through which the liquid flows as illustrated in FIG. 4A, the suspension device 1, of which the outer diameter of the piston 12 is relative small and the structure is relatively simple, can be provided.

According to this embodiment, it is possible to provide the suspension device 1 capable of switching between the electric damper 6 and the hydraulic damper 7 even if the outer diameter of the piston 12 is relatively small and the structure of the suspension device 1 is relatively simple.

Further, the communication passage is provided with the shutter members 41 and 46 as an opening and closing unit. With this configuration, when a system failure occurs in the electric damper 6, the suspension device 1 can quickly switch from the electric damper 6 to the hydraulic damper 7.

It is therefore possible to stabilize the behavior of the vehicle without shortage of damping just after the failure of the system.

The electric damper 6 is an electromagnetic damper that uses magnetic force generated by the linear motor. It is therefore possible to smoothly drive the electric damper 6.

The shutter members 41 and 46 serving as an opening and closing unit are driven using magnetic force generated by the linear motor. With this configuration, when a system failure occurs in the electric damper 6, the suspension device 1 can switch from the electric damper 6 to the hydraulic damper 7 without fail.

Further, as illustrated in FIG. 1B, the bypass hole 33 is provided at a position where the magnet 21 of the electric damper 6 does not close the bypass hole 33 when the electric damper 6 has the maximum stroke. Accordingly, since the communication passage is not closed when the electric damper 6 is driven, it is possible to smoothly drive the electric damper 6 at its maximum stroke position.

What is claimed is:

1. A suspension device comprising:
    a hydraulic damper including a rod provided with a valve for generating a hydraulic pressure when the rod is displaced between a first liquid chamber and a second liquid chamber;
    an electric damper configured to electrically displace the rod by an actuator;
    an outer casing configured to accommodate the hydraulic damper and the electric damper;
    an inner cylinder housed in the outer casing; and
    a communication passage that establishes communication between the first liquid chamber and the second liquid chamber while bypassing the valve during operation of the electric damper,
    wherein the communication passage is provided outside the inner cylinder,
    the electric damper comprises a magnet and a coil, and
    the magnet has an in-magnet flow passage formed in the magnet to establish communication between the first liquid chamber and the second liquid chamber.

2. The suspension device according to claim 1, wherein the communication passage is provided with an opening and closing unit configured to open and close the communication passage.

3. The suspension device according to claim 2, wherein the opening and closing unit uses magnetic force generated by a linear motor.

4. The suspension device according to claim 1, wherein the electric damper is an electromagnetic damper that uses magnetic force generated by a linear motor.

5. The suspension device according to claim 1, wherein a hole is provided between the first liquid chamber and the communication passage at a position where the magnet of the electric damper does not close the hole when the electric damper has a maximum stroke.

6. The suspension device according to claim 1, wherein the coil is provided between the outer casing and the inner cylinder, and
    the coil has an in-coil passage that constitutes part of the communication passage.

7. A suspension device comprising:
    a hydraulic damper including a rod provided with a valve for generating a hydraulic pressure when the rod is displaced between a first liquid chamber and a second liquid chamber;
    an electric damper configured to electrically displace the rod by an actuator;
    an outer casing configured to accommodate the hydraulic damper and the electric damper;
    an inner cylinder housed in the outer casing; and
    a communication passage that establishes communication between the first liquid chamber and the second liquid chamber while bypassing the valve during operation of the electric damper,
    wherein the communication passage is provided outside the inner cylinder,
    the electric damper comprises a magnet and a coil,
    the coil is provided between the outer casing and the inner cylinder, and
    the coil has an in-coil passage that constitutes part of the communication passage.

* * * * *